United States Patent [19]
Barnebey

[11] 3,815,335
[45] June 11, 1974

[54] WASHED ACTIVATED CHARCOAL ADSORBERS

[75] Inventor: Herbert Leonard Barnebey, Columbus, Ohio

[73] Assignee: Barnebey-Cheney Company, Columbus, Ohio

[22] Filed: Aug. 20, 1973

[21] Appl. No.: 390,011

Related U.S. Application Data

[63] Continuation-in-part of Ser. No. 275,564, July 27, 1972.

[52] U.S. Cl. ...................... 55/242, 55/474, 55/479, 55/484, 55/516
[51] Int. Cl. .......................................... B01d 29/38
[58] Field of Search ............. 55/73, 96, 98, 99, 387, 55/242, 484, 474, 479, 516; 210/275

[56] References Cited
UNITED STATES PATENTS
1,982,099  11/1934  Hechenbleikner ..................... 55/479
3,686,832  8/1972  Hori et al ............................. 55/242

FOREIGN PATENTS OR APPLICATIONS
41,572  12/1887  Germany ............................. 55/474

Primary Examiner—Bernard Nozick
Attorney, Agent, or Firm—Wm. Henry Venable

[57] ABSTRACT

This disclosure relates to activated charcoal adsorbers for low head room applications (short height) sealed so that there is no possibility of bypassing from upstream to downstream, and fitted so that the charcoal bed can be washed with water or other fluid at right angles to the air flow. The washing is generally done as a separate operation with the air flow shut off and is for the purpose of removing acid or alkali material to minimize corrosion, removal of chemical breakdown products, or the removal of an adsorbed substance to recover it or to regenerate the charcoal so that it can be used again in adsorption service. The charging of the charcoal is done at the top and also the sprays are arranged at the top so that they can be observed, adjusted, or changed. Removal of the top cover gives ready access to the top of the charcoal cell and the sprays, permits observation of the performance of the purification system, and permits the adding of charcoal as may be needed, and the servicing of the sprays. The amount of liquid flow can be measured at the point of addition or as the liquid drains from the bottom of the adsorber.

4 Claims, 10 Drawing Figures

PATENTED JUN 11 1974  3,815,335

WASHED ACTIVATED CHARCOAL ADSORBERS

CROSS REFERENCE TO A RELATED APPLICATION

This patent application is a continuation-in-part of my pending application Ser. No. 275,564 filed on July 27, 1972 entitled Modular Fluid Filter Construction, adding to the disclosure thereof the liquid washing components and an additional example of the invention disclosed therein.

BRIEF SUMMARY OF THE INVENTION

The invention disclosed herein relates to apparatus for treating gases with activated carbon. This apparatus is characterized by having a plurality of spaced apart, granular activated carbon filled, adsorption zones which extend in a generally vertical direction, and a plurality of open gas flow channels separating and spacing the adsorption zones, providing gas flow through the adsorption zones in a generally horizontal direction. Above the adsorption zones a set of liquid spray nozzles is provided, adapted to supply liquid downwardly through the activated carbon therein in a direction generally at right angles to the direction of gas flow. The gas flow channels are capped by a fluid impervious cover to divert liquid flow therefrom. At the base of the apparatus, a liquid collecting floor is provided to receive and discharge the liquid drained from the adsorption zones.

BRIEF DESCRIPTION OF THE DRAWINGS

FIGS. 1 and 2 are sectional views of the apparatus in vertical planes, FIGS. 3 and 4 are sectional views in vertical planes.

FIG. 5 is a partial vertical section through the apparatus, and FIG. 6 is a horizontal section. FIGS. 7, 8 and 9 are isometric views of three different components of the apparatus shown in combination in FIGS. 5 and 6.

DETAILED DESCRIPTION

Figure 1:
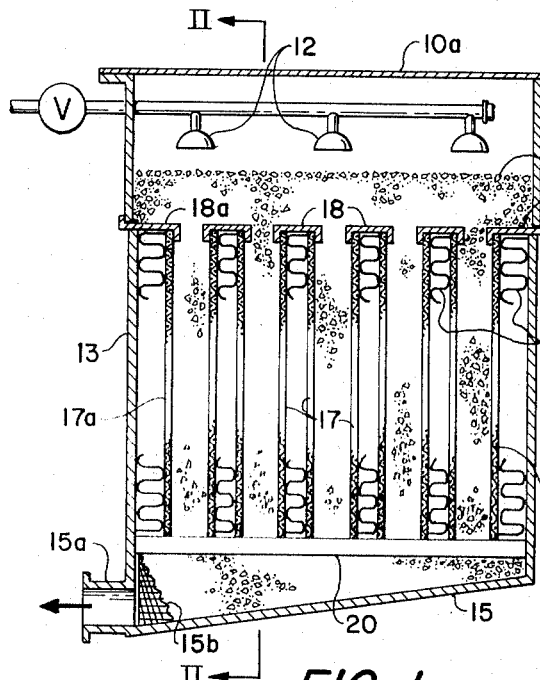
FIGS. 1 through 4 illustrate one embodiment of my invention.
Figure 2:
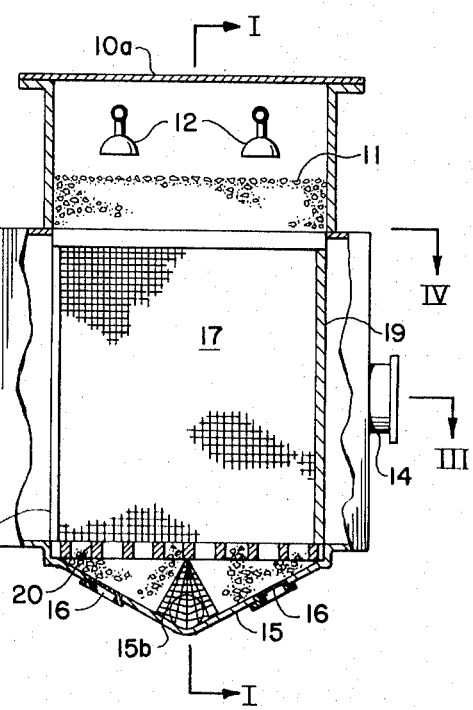

The spraying of gas-contacting solid material directly in the contacting apparatus is well known in the art. Examples of the prior art disclosing such spraying in widely different apparatus structures are in Briggs U.S. Pat. No. 1,429,222 issued on Sept. 19, 1922, and Hori et al U.S. Pat. No. 3,686,322 issued on Aug. 29, 1972. Both of these patents disclose washing the contact materials in steps between the gas treating steps, for the purpose of cleaning the material, and in both disclosures, the directions of liquid flow and gas flow through the material are the same or directly opposite. Such washing may be done for a great variety of specific purposes depending upon the particular process for which the gas-solids treatment is used. Broadly these are to remove and/or to recover substances adsorbed or otherwise deposited in the solid material during the gas treating step, to add moisture or chemicals to the solids, or to otherwise prepare the material for a further use in gas treatment operations.

An object of this invention is to provide an improved system of washing adsorbent, particularly granular activated carbon, in which the liquid flow is at right angles to the gas flow, for regular intermittant use between adsorption steps for such purposes as those above mentioned, and for the further purpose of fire extinguishing use in emergencies when and if the activated carbon should catch fire due to the high heat release incidental to many gas treating processes.

A further object of my invention is to accomplish the foregoing cross-direction gas and liquid washing flow in a relatively shallow apparatus which can be installed in low headroom spaces, in combination with means for quickly removing spent granular activated charcoal, and replacing it with fresh activated charcoal.

The embodiment of my invention illustrated in FIGS. 1 through 4 has a housing generally designated by the reference number 10, in which the granular adsorbent 11 is deposited in spaced zones for contacting the air or gas mixture to be treated, and spray nozzles 12 are installed to drench the adsorbent at right angles to the gas flow. Housing 10 has a removable filling cover 10a at the top, a generally rectangular central box section 13 provided on two opposite sides with gas inlet (or outlet) connections 14, and a bottom portion 15 provided with granular material discharge outlets normally closed by fluid-tight covers 16, and a liquid drainage outlet 15a on the upstream side of which is a blocking screen 15b, shown formed as an inclined retaining wall, to retain granular adsorbent within the housing during the liquid drainage step. The bottom portion 15 is illustrated sloping towards the drainage outlet 15b in FIGS. 1 and 2, thus serving as a liquid collecting section for the adsorbent-washing liquid supplied by the sprays 12.

Within the central box section 13, the components defining the zones or spaces which are filled with granular material 11 (when cover 10a is removed) are assembled. These components consist of four essential modular parts: (1) a set of vertically extending plane screens or perforated sheets 17 between alternate pairs of which the granular material is to be contained and open spaces for fluid flow are provided, (2) a set of caps 18 and 18a placed over pairs of the screens 17 above the open spaces to cover these spaces so that they will not be filled with granular material introduced through the hood 11, (3) two sets of preformed end strips generally indicated by the reference numeral 19 in FIG. 2 which extend along the vertical edges of pairs of screens on the inlet and outlet sides of the rectangular box 13, and (4) a set of barriers, thereafter more particularly described, between vertical edges of pairs of screens providing the open spaces.

In the embodiment illustrated in FIGS. 1 through 4, the screen modules 17 are rectangular and are assembled in parallel vertical planes. These screen modules and the cap modules 18 and 18a and the end strip modules 19 are made and stocked in a variety of shapes and sizes to permit selection of any desired configuration of screen and barrier arrangement within a housing box 13.

The assembly of the internal modules defining the areas of granulated material zones or spaces rests upon a grating platform 20 at the junction of the bottom of the rectangular box 13 with the top of the funnel 15. As the filtering zones are filled from above with granulated materials, this material first flows through the grating to fill the funnel and provide a granulated carbon seal across the bottom of those pairs of screens 17 which define the empty or fluid flow zones between such pairs of screens.

In any particular component assembly, all of the screens 17 except the extreme end screens 17a are of the same modular dimensions. The two end screens 17a are preferably somewhat shorter in width than the next screen 17 of the end pairs confining granulated adsorbent. On the fluid outlet side of the box, these end pairs of screens 17 and 17a are held in, and spaced from the box walls by, separate preformed end strip modules 19a and 19b respectively, the strip 19b being spaced from the strip 19a at the distance equal to the difference in width of screens 17a and 17b. The space between these strips 19a and 19b is filled with granulated carbon. The two cap modules 18a at the sides of the box 13 match in length the width of the screen modules 17a, thus covering only the air space between the end screens and the box wall but leaving uncovered the top area between end strip modules 19a and 19b for flow of granular material therein from the hood 11 above.

Figure 3:
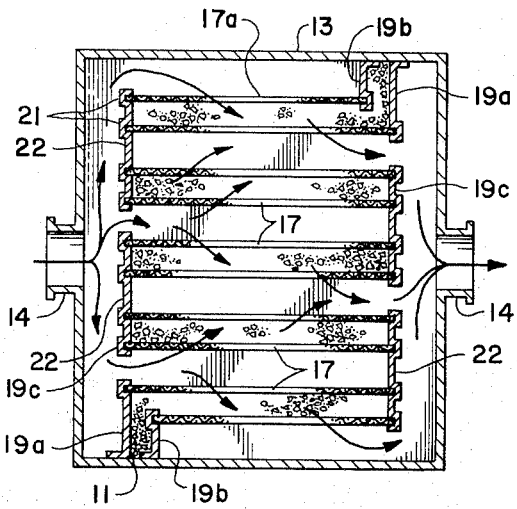
Figure 4:
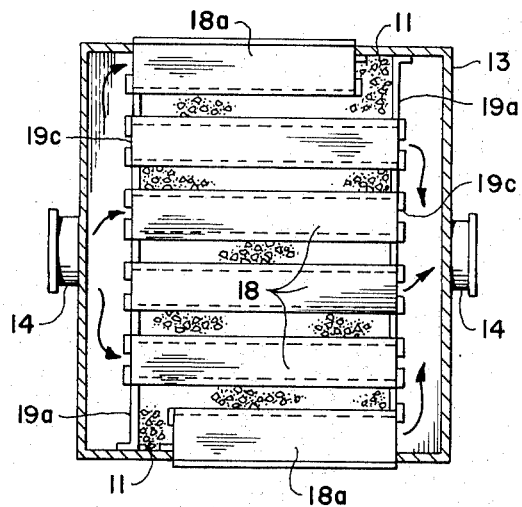
Figure 5:
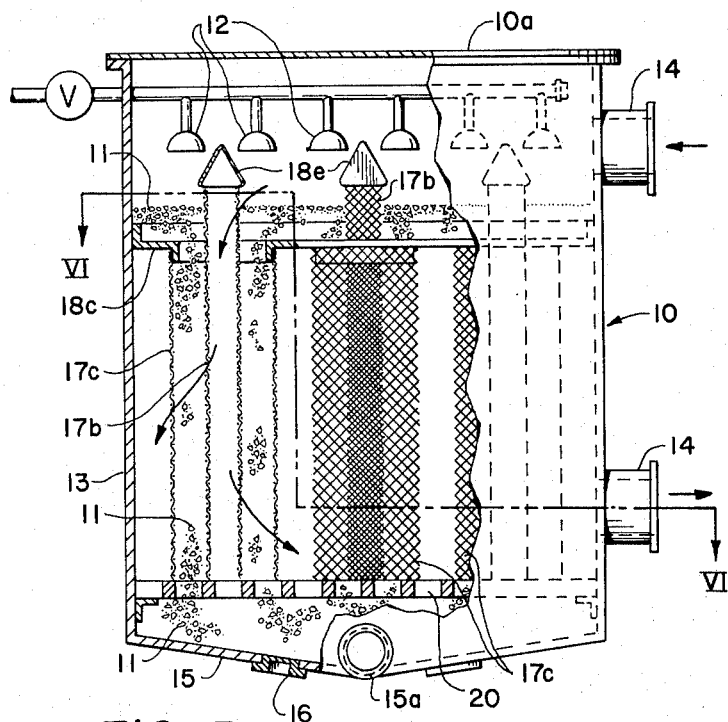
FIGS. 5 through 9 illustrate another embodiment.
Figure 6:
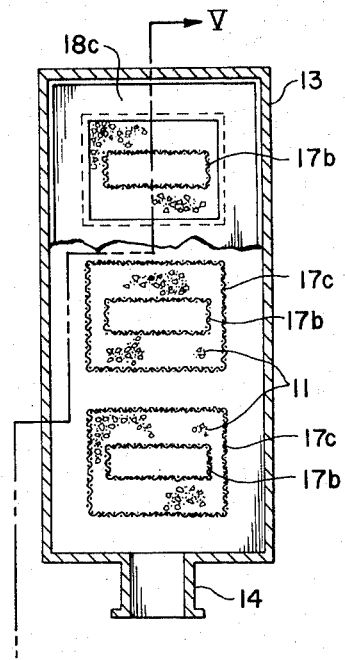
Figure 7:
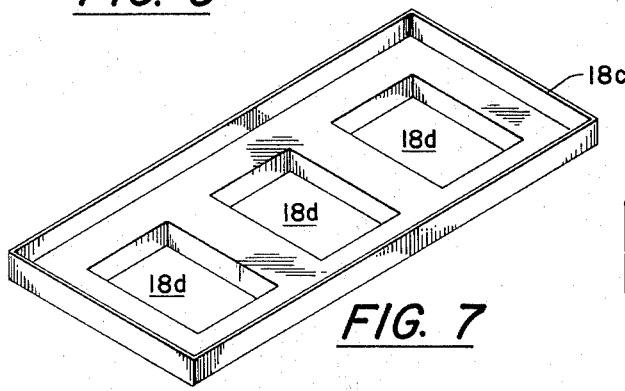
Figures 8, 9:
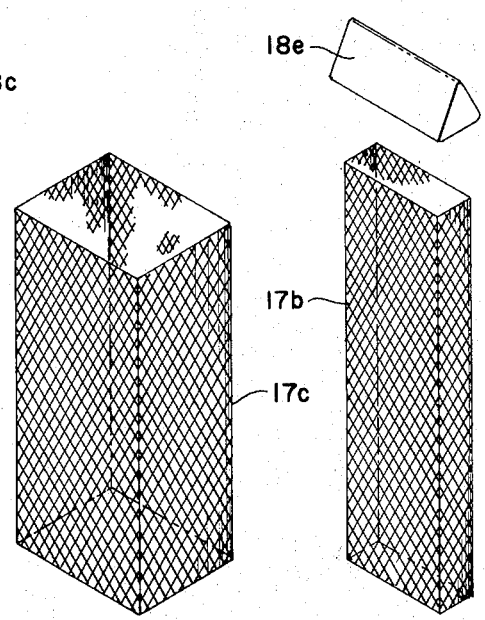
Figure 10:
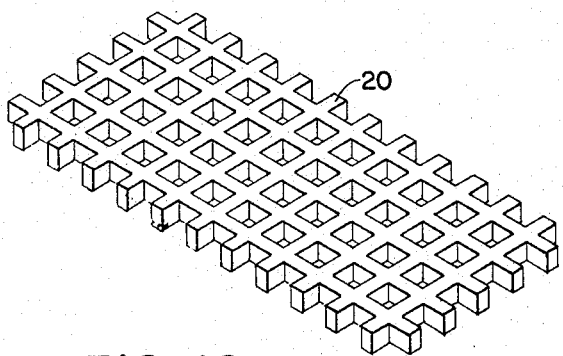
FIG. 10 is an isometric view of the grating supports 20 for supporting the adsorption cells in both embodiments.

The other end strip modules 19c in FIG. 3 are all alike and include, as an integral portion thereof, the barriers previously mentioned. These modules are in the form of flat sheets into which four parallel transverse folds 21 have been formed, two being along the edges of the modules 19c. These modules match in length the vertical height of the screen panels and the folds 20 embrace the vertical edges of the screens. The mid-portion 22 of these modules, between the two interior folds 21, forms the barrier closing the empty space from the box interior on the side on which the end strip 18c is installed.

To reinforce and hold the faces of the screens 17 and 17a in their vertical planes, in the air flow spaces, woven wire spacing panels 23 are shown in FIG. 1, to which the faces of the screens 17 and 17a may be laced at several points.

The caps 18 match in length the full width of the screens 17 and are placed across pairs thereof to cover the open spaces below and prevent flow of granular material from hood 11 therein. The caps 18 are inverted channel shape in cross section, and simply rest on the upper edges of the screens 17, the downturned edges overlapping the screens on granular-material filled sides so as to embrace a pair of screens across the empty air spaces, as shown in FIG. 1. Caps 18a are generally Z-shaped with right-angle bended flanges on each side, assembled in the housing 10 with one flange extending downwardly adjacent the screens 18a, on one side, the other flange extending upwardly to form a seat for the top section of the housing.

The caps 18 and 18a may be made of the same material as the screens 17, or of imperforate sheet material.

To reduce or eliminate corrosion difficulties, the entire container, consisting of outside shell and air inlet and outlet connections and cover, is constructed of plastic or of stainless steel material, with supports of carbon steel. The internal construction, which is in direct contact with the charcoal, is also of plastic or stainless steel construction. This includes the perforated screens 17 for retaining the charcoal in a definite bed form between the air inlet and the air outlet, and structural supports and spacers which hold the screens in their correct position, and the bottom collecting portion 15 which collects the drain liquid after it travels through the charcoal and also permits discharge of the charcoal in case it must be replaced.

The embodiment of my invention illustrated in FIGS. 5 through 9 also has a housing generally designated by the reference number 10. Within the housing 10 the granular adsorbent 11 is deposited in spaced zones for contacting the air or gas mixture, and spray nozzles 12 are installed to drench the adsorbent at right angles to the gas flow as in the first example described herein. The housing 10 is similarly constructed with a removable cover 10a, gas inlet and outlet connections 14, and a liquid collecting drainage flow 15 provided with adsorbent discharge outlets normally closed by the covers 16, and a liquid drainage outlet 15a. In the example illustrated by FIGS. 5 through 9, the zones for contacting gas with adsorbent are constructed in a different pattern from those in FIGS. 1 through 4, however. The latter pattern may be aptly epitomized as a set of generally plane adsorbent panels; the pattern in FIGS. 5 through 9 may be aptly epitomized as a set of adsorbent canisters, shown as having a rectangular cross-section in the drawings. These canisters are comprised of a central, hollow tubular core module 17b made of screen material of mesh sufficiently fine to retain granular adsorbent therein, an outside tubular screen module 17c surrounding the core module 17b at a spaced distance therefrom, and a filling of granular activated carbon between the core 17b and outside screen 17c. In this example the canisters are erect, resting on a grating floor 20 at the bottom. At the top of the canisters, a tray module 18c having a series of flanged openings 18d serves the general function of the caps 18 and 18a in the example of FIGS. 1 through 4. The openings 18d in the tray module match the ends of the outside screen modules 17c and the flanges depending from the tray openings extend a short distance into the outside screen modules, serving to center and space them in the housing 10. The core modules 17b extend above the tray 15, beyond the level of the top sealing layer of granular activated carbon on the tray 18c and into the empty space below the cover 10a. Gas flow is laterally through the adsorbent filled canister walls, from the outside to the hollow core or visa-versa, one nozzle 14 being connected to the housing 10 above the tray 18c and the other nozzle 14 being between the tray and the grating floor. The spray nozzles 12 drench the top surface of the sealing layer of carbon on the tray 18c, and the upper ends of the core modules 17b may be covered by tent-shaped caps 18e to divert flow of water from the open cores.

Although the tubular core modules 17b and outisde shell modules 17c of the canisters are shown rectangular in section only in the drawings, it is to be understood that they may be circular or other shaped tubular section, and that although only one row of three canisters is illustrated, the housing may contain any desired number of rows of canisters and any desired number of canisters per row, depending upon the adsorption capacity for which a particular installation may be designed.

The material of construction may be stainless steel or plastic as previously noted in connection with the example of FIGS. 1 through 4. Any other material suitable for the particular adsorption or filtering process for which the apparatus is intended, may of course be used.

The nozzles 12 may be operated to wash the activated charcoal at selected time intervals between adsorption steps. This washing may be done by maintaining a continuous liquid flow from the nozzles at the same rate as the liquid drains through the adsorption zones, being merely turned on at the start of the washing step and turned off at the end thereof. Alternatively, the washing may be effected by the flooding and drainage process, in which the nozzles supply liquid at a rate exceeding the drainage rate until there is a pond of water formed at the top of the adsorption zones, in which the top sealing layer of granular activated carbon supported on the shield caps 18, 18a or the tray 18c is totally submerged in the liquid. The liquid supply is then turned off and the adsorption zones are drained. Such flooding and draining may be repeated one or more times, until the adsorbent has been washed to the extent desired.

Concern has been expressed about how to handle the situation when the charcoal bed catches on fire because of high heat release within the bed. Such a fire must be extinguished by closing off the filter chamber so that it goes out because of lack of oxygen and dissipation of the heat, or by flooding with water with the air flow shut off. As soon as the temperature decreases to a suitable lower point, the air flow can be re-established. It is not suggested that one should attempt to extinguish a fire in a charcoal bed with the air flow maintained.

With the spray and drainage system illustrated and described, the extinguishing of a fire is much easier because the charcoal bed can be drenched at right angles to the air flow. As soon as the temperature has been reduced to a suitable point, the water is shut off and the air flow is re-established. If the charcoal bed is not in good condition because too much of it has been burned away or the impregnant has been volatilized or washed off, the charcoal can be easily replaced by withdrawing the spent charcoal from the bottom and adding new charcoal at the top. This means that the only significant down time is that required to cool off the bed with a water deluge.

A series of tests were run to demonstrate extinguishing of a fire in adsorbers as disclosed herein. A prototype unit was set up and operated at rated velocities. The bed was set on fire in one spot with a torch and allowed to spread enough to give a good size fire. The air flow was shut off. The bed was deluged from top to bottom (perpendicular to the air flow direction). After a period of 5 minutes, the air flow was re-established and it was determined that the fire had been completely extinguished. I do not recommend that the extinguishment of a fire be attempted with full air flow maintained. It should either be shut completely off or reduced greatly. The extinguishing is done rapidly and the air flow can then be re-established.

Although only two examples of my invention have been specifically illustrated and described above, my invention is not limited to these examples and is comprehended by the following claims.

I claim:
1. Gas treating apparatus comprising
   a plurality of spaced, granular activated carbon filled, adsorption zones extending in a generally vertical direction,
   a plurality of open gas-flow channels separating and spacing said adsorption zones and providing gas flow transversely through said zones mounted in a housing communicating with the inlet and outlet thereof,
   a set of liquid applying spray nozzles above the top of said adsorption zones adapted to supply liquid to flow by gravity through said activated carbon from top to bottom of said zones,
   granular adsorbent supporting shields covering said gas-flow channels at the top thereof,
   a layer of granular adsorbent between said spray nozzles, said shields, and said adsorption zones,
   a liquid collecting drainage floor below the bottom of said zones for receiving the liquid supplied by said nozzles after flowing through said zones,
   a liquid drainage outlet adjacent said drainage floor, and
   a sealing bed of granular activated carbon between said bottom of said zones and said liquid collecting drainage floor.

2. The apparatus of claim 1 further characterized by said adsorption zones being in generally vertical planar form, comprised of pairs of parallel vertical screens and a filling of granular activated carbon between each pair of said screens.

3. The apparatus of claim 1 further characterized by said adsorption zones being in generally hollow canister form, comprised of an inside tubular screen core, an outside tubular screen shell, and a filling of granular activated carbon between said core and said shell.

4. The apparatus of claim 1 further characterized by normally closed openings in said drainage floor for the removal of spent activated granular charcoal.

* * * * *